United States Patent [19]

Graf

[11] 4,371,753

[45] Feb. 1, 1983

[54] MINIATURE FLUID-CONTROLLED SWITCH

[76] Inventor: Ronald E. Graf, Rte. 3, Box 520, Crozet, Va. 22932

[21] Appl. No.: 963,893

[22] Filed: Nov. 27, 1978

Related U.S. Application Data

[63] Continuation of Ser. No. 752,983, Dec. 21, 1976, abandoned.

[51] Int. Cl.³ ........................ F15C 1/16; H01H 35/26; H04Q 3/42

[52] U.S. Cl. ............................... 179/18 GF; 137/814; 200/81.4; 200/81.6; 200/187; 200/DIG. 43

[58] Field of Search .................. 179/18 G, 22, 18 GF; 137/814, 822, 825, 827; 200/81.6, 81.4, 81.9 HG, DIG. 43, 187, 182, 214

[56] References Cited

U.S. PATENT DOCUMENTS

| | | | |
|---|---|---|---|
| 3,234,335 | 2/1966 | Keister | 179/22 X |
| 3,492,612 | 1/1970 | Ayres et al. | 200/81.6 |
| 3,493,173 | 2/1970 | Monge et al. | 200/DIG. 43 X |
| 3,526,723 | 9/1970 | Thomson | 179/18 GF |
| 3,539,743 | 11/1970 | Winter | 200/81.6 |
| 3,612,794 | 10/1971 | Winter | 200/81.6 |
| 3,670,130 | 6/1972 | Greenwood | 200/183 |
| 3,702,909 | 11/1972 | Kraakman | 200/83 R |
| 3,801,749 | 4/1974 | Jovic | 179/18 GF |
| 3,955,059 | 5/1976 | Graf | 200/214 |
| 4,004,103 | 1/1977 | Liu et al. | 179/18 EA |

*Primary Examiner*—Thomas W. Brown

[57] ABSTRACT

A fluid-controlled switch capable of being mass produced and densely spaced, having two groups of fluid control inputs, at least two fluid outputs, and an internal movable mass is disclosed. The fluid energy necessary for switching is used economically, fluid power consumption being drastically reduced after switching is complete, even though fluid power input may continue thereafter. The movable mass, which may be a group of little masses, divides the switch into two volume complexes. Switching is caused by a pressure difference between the two complexes. The pressure difference between the two complexes is caused by sufficient flow into one but not the other group of fluid inputs. The switch may be used to switch simultaneously one or more primary signals and corresponding status signals, which may be used to determine whether all switches in a row or column or other grouping within an array of switches are reset. Types of signals for either primary or status signals may be of any compatible type including electrical, fluidic, and optical signals. The fluid-controlled switch may be used as a follower of an electrically-controlled switch, to provide isolation between controlling and controlled circuits in relay applications. It can also be controlled by any logical combination of electrically-controlled fluid switches. Two sample switching arrays, one in which electrical signals are associated with rows and columns, and one in which fluid signals are associated with rows and columns, both produce destructive mark operation with logical AND and logical EXCLUSIVE OR being performed at the cross-points on electrical and fluidic signals respectively.

15 Claims, 11 Drawing Figures

MINIATURE FLUID-CONTROLLED SWITCH

This is a continuation of application Ser. No. 752,983, filed on Dec. 21, 1976, now abandoned.

BACKGROUND OF THE INVENTION

The present invention deals with fluid-controlled switches, some of their accessories, their combination with electrically-controlled switches to produce conglomerate switches with excellent characteristics, and switching networks containing the switches. There are two main areas in which electrically-controlled electrical relays are extensively used. The first is in telephone switching networks, where ferreeds and remreeds have been extensively used. These devices are bulky and must be manufactured and checked individually. Also their operation necessitates electromagnetic fields being in proximity to transmission lines. The remreeds also carry fairly low power. Therefore, it is one purpose of the present invention to show how relays of reduced bulk, excellent isolation, low closed-circuit impedance, negligible open-circuit conductance and capacitance, and good reliability can be manufactured by mass production techniques. These relays can be easily integrated into a present telephone switching network, since the range of operating voltages from a few volts up to hundreds of volts includes the voltage currently used in such networks. The subject switches of the current invention have a further advantage over remreeds in that they carry status signals in their reset state to determine whether a particular line is currently in use.

A second use of electrically-controlled electrical relays is in the area of controlling high power or high voltage circuits. Solid-state relays for such applications are now available with fair isolation between controlling and controlled circuits for about $5.00 apiece. Therefore, it is a further purpose of the present invention to provide relays capable of performing high voltage and high power switching with a wide range of control voltages, low resistance heating, and excellent electrical isolation between controlling and controlled circuits. Further, the relays of the present invention are not bulky and can be manufactured cheaply by mass production techniques.

Some other purposes of the present invention are to provide:

(1) an efficient fluid amplifier for hydraulic systems with said amplifier having positive shut-off, high power capacity, and low switching power consumption;

(2) a compact and efficient fluid to electric signal transducer;

(3) a compact but powerful electric to fluid signal transducer in the form of a conglomerate switch consisting of an electrically-controlled fluid switch connected to a second switch, which is a fluid amplifier switch acting as a follower;

(4) a switching system which indicates status at all times by a separate set of signals, and two methods of producing destructive mark operation;

(5) a power transducer taking heat as an input and producing fluid flow power as an output;

(6) a three port fluid system inhibiting flow between two ports but allowing almost free flow between any other pair of ports.

A BRIEF SUMMARY OF THE INVENTION

This invention relates to a fluid-controlled switch capable of switching various type signals such as electrical, electromagnetic, fluid, or optical signals, or any combination and multiplicity of these signals; and further capable of indicating when it is reset by switching a status signal or signals. The fluid-controlled switch can be mass produced by well-known techniques in the art of fluidics. It can act as an interpreter of fluid pressures, as a fluid amplifier, or as an interface between fluidic and electronic computers. However, the primary motivation for its invention, and its primary use, is expected to be as a component of miniature electrical relays having low closed-circuit impedance and high open-circuit resistance, and being capable of being produced by mass production techniques and of controlling high voltages and energies with substantially complete isolation between controlling and controlled circuits, thus making it suitable for telephone switching applications as well as other relay applications. Another component of the minature electrical relays is an electric to fluid signal transducer, such as is described in U.S. Pat. No. 3,955,059 by the same inventor. It will control the fluid-controlled switch. Almost as importantly, as a result of this invention it will be possible to manufacture inexpensively a switching network exhibiting destructive mark operation using a single logic line for each row and for each column and operating with a minimum of energy employed in switching.

Broadly described, one embodiment of the present fluid-controlled switch invention would include a cylindrical cavity containing a globule of mercury. The mercury can be forced to one end or the other of the cavity by a fluid pressure difference between the two parts of the cylindrical cavity separated by the mercury globule. A fluid opening is stationed at each end of the cavity. The opening consists of one or more holes, maybe in a porous plug, all of the holes being small enough so that mercury can not be forced out of the cavity through the opening. Each of the two openings leads through a fluid channel radially into a circular chamber, known as a vortex chamber, the vortex chambers being drained at their centers to a lower pressure area. The drain is included to provide an exit for fluid expelled from the mercury containing cavity, as the globule is moved toward a drain. One fluid input is connected to one vortex chamber and a second fluid input is connected to the second vortex chamber. The fluid inputs are connected tangentially at the circumference. They provide both logic and the only source of switching power to the switch, other than the lower pressure drains. Sufficiently high pressure at one input but not at the other will cause higher pressure on the side of the globule connected fluidically to the sufficiently higher pressure input. The resulting difference when sufficiently large will cause the globule to move toward the lower pressure region. Meanwhile, fluid enters the high pressure input, proceeds to its vortex chamber, travels around the chamber circumference, and leaves radially toward the cavity. Thence fluid enters the cavity on the high pressure side, moving the globule to the low pressure side. The motion expels fluid from the low pressure side of the cavity until the globule reaches its equilibrium position at the end of the cavity. The expelled fluid travels to the vortex chamber on the lower pressure side of the switch. The expelled fluid enters the vortex chamber radially and proceeds, with little pressure drop, to the drain, through which it exits to a lower pressure area. Meanwhile, some fluid may escape from the center drain of the higher pressure vortex chamber, but pressure is reduced at the center of this chamber, due to the centrifugal force set up by tangential flow.

The vortex chamber allows significant flow to take place between any two of its three openings except for flow from the tangential fluid input to the drain. Other fluid mazes which allow significant flow from an input to one connection and from that connection to a drain but not from the input to the drain may be substituted for the vortex chamber. A Y-shaped juncture would have this property if hooked up correctly.

It is possible to generalize the vortex chamber, the Y-shaped juncture, or an input without either of these so that the fluid inputs can be multiple. For instance, two or more tangentially connected inputs can be placed around a vortex chamber. The Y-shaped juncture could be replaced by a tree-shaped juncture with all branches leading in toward the base of the trunk. One branch would be considered the output and all other branches would be considered inputs. In any case, the inputs all have a comparable function and operating ability.

The switch as described above or generalized to have more than one cavity, each containing a mercury globule and each connected fluidically in parallel, can be used as a follower to an electrically-controlled switch, which acts to block one input to the fluid-controlled switch while introducing high pressure flow to the other input. When the electrically-controlled switch is reversed, blocked and unblocked status of the fluid inputs is reversed, thus causing a reversing of the fluid-controlled switch. The electrically-controlled switch may be replaced by two electrically-controlled switches, one controlling each input.

If it is desired to switch electrical signals than at least two conductors extend into at least one end of any mercury containing cavity in such a way that the mercury will electrically connect the said at least two conductors whenever the mercury is at said one end of the cavity, but not when the mercury is at the other end of the cavity. Optical and fluidic signals can similarly by allowed to pass or be interdicted at either or both ends of the mercury containing cavity, depending on the presence or absence of the mercury at the end of the cavity at which the signal conductors are stationed.

The mercury globules can be replaced by tiny plungers of cylindrical, spherical, or other shape. Grooves on the surface of the plunger or holes through the plunger can be used to transmit or block fluid signals depending on plunger position. If the fluid enters and exits the cavity symmetrically with respect to the plunger, the net effective force on the plunger due to fluid signals, whether being blocked or unblocked, will be nearly zero. Electrical transmission can be alternately forwarded and blocked by using conducting rings or partial rings on the plunger surface or by making the entire plunger a conductor. Mercury contacts can be used with the plunger. Optical transmission can be alternately forwarded and blocked in several obvious ways, one of which is described later in connection with FIG. 4. Each type of alternate transmission and blockage of electrical, fluidic, optical, or other type signal need not interfere with the transmission and blockage of other types of signals in the same switch cavity, although the status of all signal paths in the same switch will be correlated.

In single relay application it is further desirable to have a small non-electromagnetically-radiating electric to fluid power converter, which is also described in the present invention. The power converter contains a high pressure chamber and a low pressure chamber separated by at least one channel blocked by a wick, or porous material, or fiber bundle, which transfers condensed vapor (liquid) from the low pressure chamber to the high pressure chamber. The channel blocker, being saturated with liquid, at least at some set of surfaces separating the two chambers, also prevents vapor from travelling along the channel from the high pressure to the low pressure chamber. In one version, a thermocouple heats the high pressure chamber to vaporize a substance at a temperature slightly above ambient switch temperature. The thermocouple also cools the low pressure chamber to condense the working substance. In another version, a resistor is used for heating, and no electrical cooling is supplied.

In switching network applications a method of obtaining destructive mark operation without using fluid amplifiers but using row activating and column activating fluid lines is described. A similar description of another switching network using row activating and column activating electrical lines is also given. In both networks logical AND and logical EXCLUSIVE OR are performed at the cross-point. In the first case at the cross-points the logic is fluid logic and the switches are purely fluid activated. In the second case at the cross-points the logic is electronic logic and the switches are electrically activated conglomerate switches having a second stage which is fluid activated.

All switches described may have latching means to maintain the stable switched states which depend on a potential energy field for the movable mass. The potential energy may be electromagnetic, electrostatic, deformation, gravitational, or surface tension. Other obvious forms of latching, including suction cups, may be employed.

BRIEF DESCRIPTION OF THE DRAWINGS

Other objects, features, and advantages of the present invention will become apparent upon examination of the following detailed description, appended claims, and the accompanying drawings in which:

DETAILED DESCRIPTION OF THE PREFERRED EMBODIMENT

Figure 1:
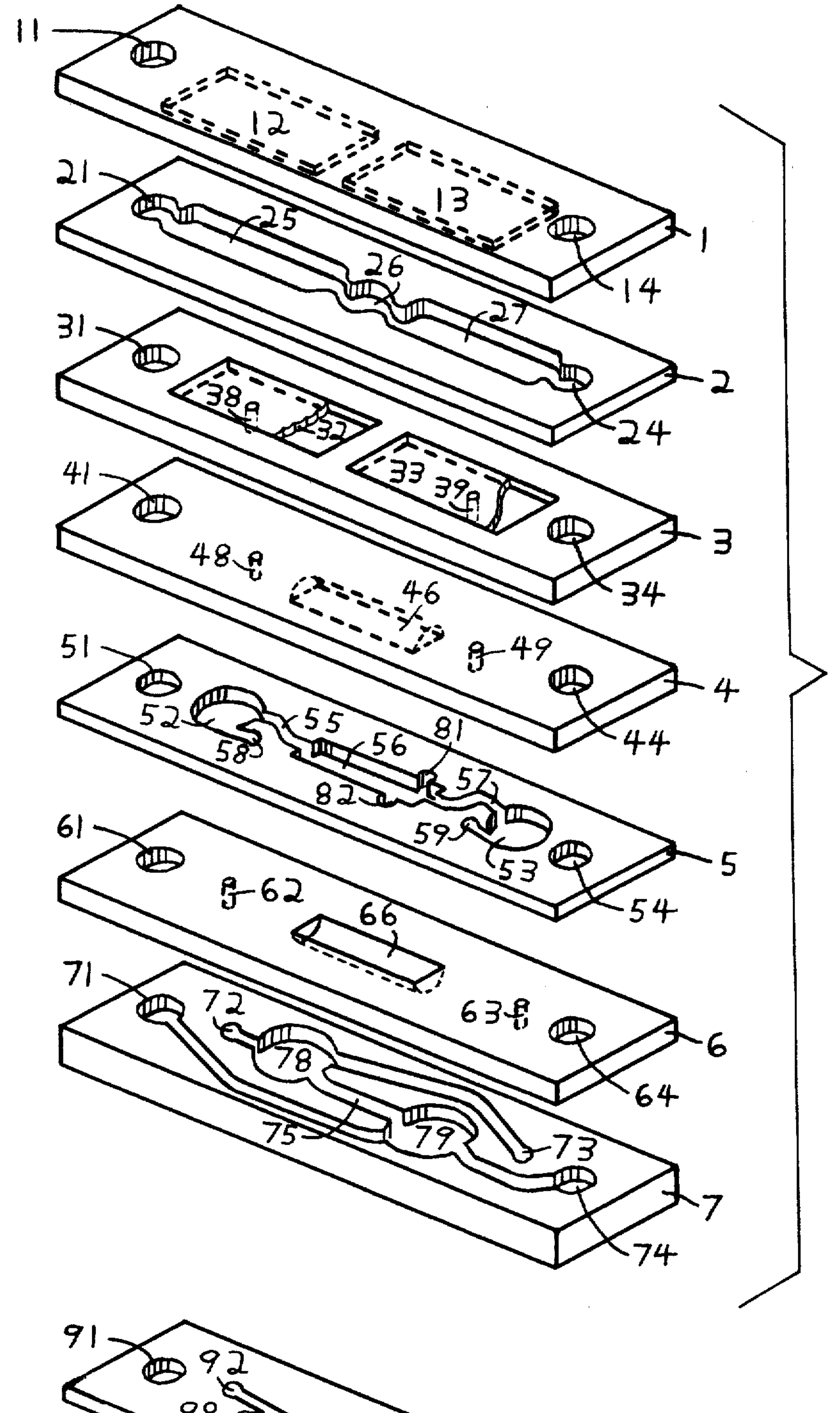
FIG. 1 is an exploded perspective view of the combination of a fluid-controlled switch residing on substrates 4, 5, and 6, controlled by an electrostatically-controlled switch residing on substrates 1, 2, and 3, with fluid power coming from an electric to fluid power converter residing on substrate 7.

Refer now to FIG. 1 where there is disclosed a first embodiment of the present invention. Most of the seven substrates numbered 1 through 7 can be roughly five times as wide as they are deep and four times as long as they are wide, if only a single switch, with no others alongside, is desired. These proportions are not crucial, nor are the relative positionings of many of the components crucial. They are merely given as one possible example and should not restrict any general description of the invention. The substrates 1, 2, and 3 when assembled with appropriate insertions will become an electrostatically-controlled fluid switch, such as would be covered in the description of U.S. Pat. No. 3,955,059, by the present inventor. A first dielectric substrate 2 has a first and second chamber 25 and 27, respectively, formed therein, which chambers are connected by a constricted region 26. At the other end of each of the chambers is a through hole 21 and 24, respectively, which through holes are connected to the near chambers 25 and 27, respectively, by means of channels or possibly just openings.

Figure 5:
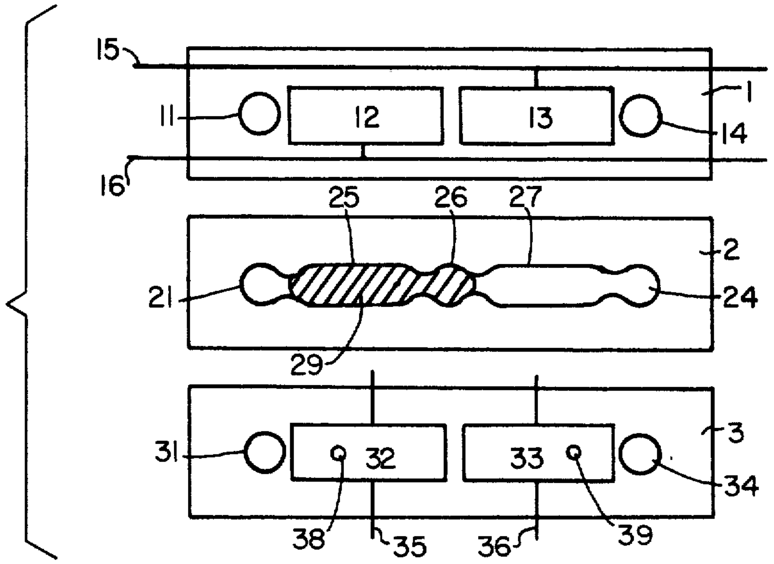
FIG. 5 is a two-dimensional representation of substrates 1, 2, and 3 of FIG. 1 with a mercury globule and electrical control lines added.

Positioned below substrate 2 is a substrate 3, which is formed of a dielectric material. Electrode plates 32 and 33 are formed on the upper surface of the dielectric substrate 3, by one of several known means. These electrodes are connected to electrical control lines 35 and 36 shown in FIG. 5, which may be formed partially on substrate 3 by various known means. A very thin dielectric coating (not shown) is placed or deposited over the electrode plates, and a thicker coating may be placed over the electrical control lines. The dielectric coating on the plates may be an oxide layer induced by anodizing the metal of the electrode plates.

An upper dielectric substrate 1 is provided having a structure similar to that of substrate 3, and having a pair of electrode plates 12 and 13 deposited on the underside thereof, in a manner similar to the depositing of electrode plates 32 and 33. These electrodes are connected to electrical control lines 15 and 16 shown in FIG. 5, which may be formed partially on the underside of substrate 1 by various means. A very thin dielectric coating (not shown) is placed or deposited over the electrode plates.

Substrates 1, 2, and 3 are secured together by bonding, clamping, or some other means in numerical order from top to bottom in such a way that through holes 11, 21, and 31 connect as do holes 14, 24, and 34. Holes 38 and 39 in substrate 3 now form fluid signal exit holes from chambers 25 and 27, respectively. There can be ridges and valleys running parallel to the long dimension on the surface of substrates 1 and 3 to aid in switching a mercury globule 29, which will be placed in chamber 25 or 27. The mercury can be introduced into chamber 25 via holes 11 and 21 under sufficient pressure and with corresponding sufficient voltage applied to plates 12 and 32 to allow the mercury to enter chamber 25 but not to proceed significantly beyond the far borders of plates 12 and 32. The endless column of through holes is made so that switches may be stacked one on top of another. If, after filling chamber 25, a rod is inserted into holes 11, 21, 31, etc. and into holes 14, 24, 34, etc., then the rods can prevent escape of the mercury while not totally blocking the holes, so that holes may be used later as fluid pathways. If, after insertion of the rods, voltage on plates 12 and 32 is relaxed, then the merury globule, which initially filled to roughly the borders of the plates, will now expand into central contricted region 26. The expansion in the no-voltage state facilitates switching, since the mercury is always touching the dielectric coatings of all four control plates. Sufficient voltage applied to any opposing pair of plates will attract the mercury globule into the chamber between the electrified plates.

Assuming now that fluid pressure is applied to holes 11, 21, and 31 and to holes 14, 24, and 34, then chambers 25 and 27 will be pressurized with roughly the same uniform pressure. If the mercury globule is in chamber 25, it will block exit hole 38, but fluid will exit through hole 39 in chamber 27. If, on the other hand, the globule is now switched to chamber 27, by applying sufficient voltage to plates 13 and 33, then exit hole 39 in chamber 27 will be blocked, but fluid will exit under pressure through hole 38 in chamber 25. An electrostatically-controlled fluid switch residing on substrates 1, 2, and 3 has now been described. It outputs fluid under pressure from either hole 38 or hole 39, but not both, depending on its switched state. Holes 38 and 39 will, of course, be connected to the fluid inputs of the fluid-controlled switch residing on substrates 4, 5, and 6, which is about to be described.

Figure 6:
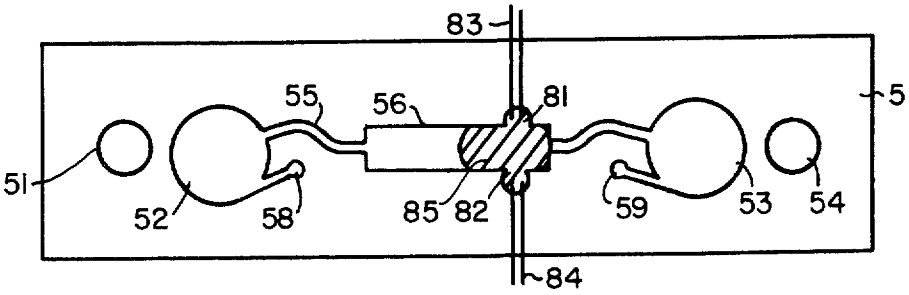
FIG. 6 is a two-dimensional representation of substrate 5 of FIG. 1 with a mercury globule and electrical transmission lines added to the cavity.

Describing now the fluid-controlled switch, a first dielectric substrate 5 has two vortex chambers 52 and 53, respectively, formed therein. The chambers are fed tangentially through channels having ends 58 and 59, respectively. Fluid paths 55 and 57, respectively, leave chambers 52 and 53, respectively, in a radial direction, and proceed to opposite ends of cavity 56. Terminals 81 and 82, connected to electrical transmission lines 83 and 84 shown in FIG. 6, will be connected to each other electrically, whenever a mercury globule 85 in cavity 56 is situated to the right end of the cavity. The electrical connection will be broken whenever the mercury globule 85 is situated at the other end of the cavity.

Positioned above substrate 5 is a substrate 4 containing a half cylinder cavity 46, which will fit above cavity 56. Fluid holes 48 and 49, respectively, will receive fluid input from holes 38 and 39, respectively, which are outputs of the electrostatically-controlled switch above. The through holes 48 and 49, respectively, which are inputs to the fluid-controlled switch, fluidically connect with ends 58 and 59 on substrate 5.

Positioned below substrate 5 is a substrate 6 containing a half cylinder 66, which will fit below cavity 56, so that cavities 46, 56, and 66 form a cylindrical cavity which will contain a mercury globule. Exit holes 62 and 63, respectively, communicate from the centers of vortex chambers 52 and 53, respectively, to low pressure regions 72 and 73, respectively, outside the fluid switch and on substrate 7.

Substrates 4, 5, and 6 are secured together by bonding, clamping, or some other means, in numerical order from top to bottom, in such a way that through holes 41, 51, and 61 connect as do holes 44, 54, and 64.

In operation, after the fluid-controlled switch in substrates 4, 5, and 6 is assembled, including the introduction of a mercury globule into cavity 46-56-66, the switch has two fluid inputs 48 and 49, and two fluid outputs 62 and 63. The inputs supply both power and logic to the switch. The switch can be operated either by a pulse of fluid power or by continuous sufficiently rapid fluid input at one or the other fluid input, but not at both inputs simultaneously. The continuous fluid input mode will now be described. Assume first that the mercury globule is on the end of the cavity nearest to vortex chamber 52, and that we wish to switch the globule to the other end of the cavity, nearest to vortex chamber 53. This will be accomplished by blocking fluid flow to input 49, but supplying fluid high pressure flow to input 48, both inputs being on substrate 4. The input fluid flows into and through hole 48 to end 58, and thence into vortex chamber 52. Most fluid travels around chamber 52, and out along channel 55 to one end of cavity 56. This fluid flow forces the globule toward the other end of cavity 56, while pushing fluid in front of the globule. The pushed fluid exits from cavity 56 along channel 57, from which it enters vortex chamber 53 radially. Thus no vortex is formed in chamber 53. Fluid exits from the center of chamber 53 through hole 63 in substrate 6. When the mercury globule comes to dynamic equilibrium rest at the end of cavity 56 nearest chamber 53, then fluid flow is cut off from channel 57, and fluid stops exiting from hole 63. Fluid continues to enter hole 48, thus continuing pressure on the globule. Flow is at a much reduced rate now, because the only exit path for the fluid entering at 48 is as follows. Fluid enters hole 48, proceeds to end 58, and then enters vortex chamber 52 tangentially. The fluid then circulates in a spiral toward the center of the chamber, where it eventually exits through hole 62. But, the pressure at hole 62 is much lower than the pressure at end 58 or channel 55, because of centrifugal forces set up by the spiraling motion. Thus, fluid leaves vortex chamber 52 under a very low pressure head.

By symmetry, since the left side of the switch can be a mirror image of the right side of the switch, except for the transmission terminals 81 and 82, we see the following. The globule is at the end of cavity 56 nearest chamber 53, but it can be switched back to the other end of cavity 56 by blocking fluid input hole 48, and supply high pressure flow to fluid input 49. As a matter of fact, the globule could state anywhere in the cavity 56 and will be forced to the end opposite to the side of the switch receiving high pressure fluid flow.

The pulse operation of the switch is similar to continuous input operation, but depends a little more on momentum of the globule once set into motion. Also the globule should be made bi-stable for pulse operation, by forming a constriction at the center of cavity 56, so that once switching occurs the globule will stay in place.

Both the operation of the electrostatically-controlled fluid signal output switch, residing on substrates 1, 2, and 3, and the operation of the fluid-controlled electric signal output switch, residing on substrates 4, 5, and 6 have been described. Now we will combine the two switches into a conglomerate switch, by securing the bottom of substrate 3 to the top of substrate 4 by bonding, clamping, or some other means, in such a way that holes 38 and 39 mate with holes 48 and 49, respectively. Thus the output of one switch becomes the input of the other. We now have a conglomerate switch, such that if the electrostatically-operated switch is switched from one output state to the other, then the fluidically-operated switch will follow and change its transmission state. This is obvious for the following reasons, remembering the operating characteristics of the fluid-controlled switch. In one position of the electrostatically-controlled switch, fluid is blocked at hole 38 from entering hole 48, while fluid exits from hole 39 and enters hole 49 under pressure. In the other position of the electrostatically-controlled switch, fluid is blocked at hole 39 from entering hole 49, while fluid exits from hole 38 and enters hole 48 under pressure.

The fluid power to operate the conglomerate switch can be supplied in any reasonable fashion, pressurizing holes 21 and 24 and any holes in other substrates connected directly thereto. A low pressure sink must also exit, at holes 62 and 63. We now have an electrostatically-operated electric relay, in the form of a conglomerate switch, with almost total isolation between controlling and controlled circuits, high open-circuit impedance, good closed-circuit conductance and negligible electromagnetic radiation during and after switching. Various changes and substitutions of components can be made as will be discussed later.

One way to supply the necessary fluid flow energy to operate the conglomerate switch is shown in FIG. 1. It would only be used in the case when no other suitable source of fluid power is available or practical. A compressor could be used in most cases. The power source is contained on substrate 7 of FIG. 1. It consists of a low pressure chamber 78 and a high pressure chamber 79, joined by a channel 75, which contains a wick. Volatile fluid is vaporized in chamber 79 by electrical heating. The vapor proceeds to holes 71 and 74. When substrate 7 is secured to the bottom of substrate 6, these holes communicate with others as follows. Holes 71, 61, 51, 41, 31, 21, and 11 are directly connected as are holes 74, 64, 54, 44, 34, 24, and 14. A plate or plugs must be secured above or in substrate 1 to prevent vapor from exiting from holes 11 and 14. The vapor proceeds from holes 71 and 74 through the conglomerate switch, and finally exits via hole 62 or hole 63. It is then picked up in channels 72 or 73 of substrate 7, and carried to chamber 78 for condensation. A thermocouple may act between chambers 78 and 79 to cool chamber 78 while heating chamber 79. Other forms of heating and cooling might be employed. In any case, chamber 78 should be the coolest place in the composite switch. Condensed vapor in liquid form permeates the wick and proceeds by capillary action from chamber 78 to chamber 79, where it will again be vaporized. The liquid in the wick also serves to prevent vapor from travelling from chamber 79 to chamber 78 via channel 75. The wick may fill a sizable portion of chamber 78. The power system described should only be used in situations where ambient switch temperature is predictable and relatively constant, such as underground or in air conditioned buildings in fail-safe situations. The wick may be replaced by any structure capable of being permeated by liquid and having openings small enough to stop vapor under considerable pressure when permeated by liquid. A bundle of thin fibers or bristles or hairs might do this. A porous plug might also be used.

Figure 2:
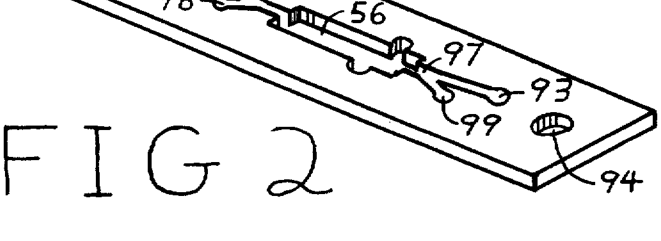
FIG. 2 shows a replacement for substrate 5 in FIG. 1, the vortex chambers being replaced by Ys performing the same function.

Now that the switch of FIG. 1 and its components have been described, some variations for particular applications and some generalizations for the switch as a whole or for components considered separately, i.e. the fluid-operated switch, will be mentioned. One generalization would entail replacing the vortex chambers 52 and 53 with other means of reducing pressure on a flow path between the fluid input and the fluid output on the same side of a cavity. For instance, referring to FIG. 2, a Y could be substituted for the vortex chamber. Flow from input 99, through channel 97, to cavity 56, containing the globule, is virtually unimpeded. Likewise, flow from cavity 56 through channel 97 to sink 93 is virtually unimpeded. But flow from input 99 to sink 93 is greatly impeded, because velocity of fluid flow must almost reverse direction at the juncture of the Y-connection, thus causing loss of pressure and turbulence.

Of course, any input arrangement for the fluid switch can be generalized to replace the single input to each complex with multiple inputs each performing the same function. For instance, a vortex chamber may have more than one tangential input, each capable of increasing pressure on its side of the switch. Similarly, the Y-juncture can be replaced by a tree-like juncture with many branches, one of which is the output, such that input into any of the other branches will cause a raising of pressure on the side of the switch receiving input.

Another generalization would be to supply more than one cavity, each containing a mercury globule, each cavity being connected to channels 55 and 57 of FIG. 1 in parallel. Of course, the whole switch or any symmetrical part could be duplicated and connected in parallel to achieve the same result, but this would be wasteful. When the controlling logic, culminating in an electrically controlled switch in the primary example, sets or resets, then all the globules will follow by setting or resetting. The case of two mercury globules switching in parallel is especially appropriate to telephone switching, since conversations are normally carried on two lines, which must be switched simultaneously. The cavities containing the globules in parallel need not be on the same substrate. The use of different substrates would facilitate bringing more than one pair of tip-and-ring electrical transmission lines to each switching cross-point.

The fluid-controlled switch, an example of which is shown on substrates 4, 5, and 6 of FIG. 1, can be considered as a transducer or possibly a relay, being controlled by fluid input signals deriving from any source, such as fluid systems or fluidic computers, and translating the information contained in the controlling signals to any compatible form of signal output, such as electrical, fluidic, and optical. A switch can be set with respect to unconnected but correlated signals whenever the globule is at a first end of the cavity and reset whenever the globule is at the second end of the cavity, while the switch can be set with respect to other unconnected but correlated signals whenever the globule is at the second end of the cavity and reset whenever the globule is at the first end of the cavity. For instance, one optical signal, one fluid signal, and one electrical signal can be associated with each end of the mercury containing cavity. A more practical example is the following.

In a telephone application, a status indicating electric line might enter and leave the reset position of all switch globules in a particular row of an array in series, so that the line is closed when and only when all switches in that row are reset. This could indicate when a line represented by a particular row in an arrow is available for use. Similarly, all switches in a particular column of an array might be optically connected in series so that a beam of light shines through when and only when all switches in the column are reset. This would indicate, whenever the light shines through, that the transmission line represented by the column in the array is available for use. Switches in the set position are associated with the connection of transmission lines at cross-points.

A third alternative means of indicating all switches in a row or all switches in a column are reset is to test fluid pressure at the end of the cavity containing the globule in the reset position. If all switches in a row communicate fludically in parallel to an indicator from their reset ends, then higher pressure will only exist at the indicator when at least one switch in the row is set. If all switches in a row are reset then all the parallel fluid communication channels are blocked.

The electrostatic switch residing in substrates 1, 2, and 3 of FIG. 1 can be replaced, in the conglomerate switch residing on substrates 1, 2, 3, 4, 5, and 6, by one or more electromagnetically-controlled switches, or by two electrostatically-controlled switches, or by any other logic combination of switches and gates which are capable of supplying fluid flow or pulses selectively to holes 48 and 49. In the conglomerate switch of FIG. 1, the ends of holes 48 and 38 may have to be enlarged where they meet to assure a good fluid connection. The same is true for holes 49 and 39.

Figure 3:
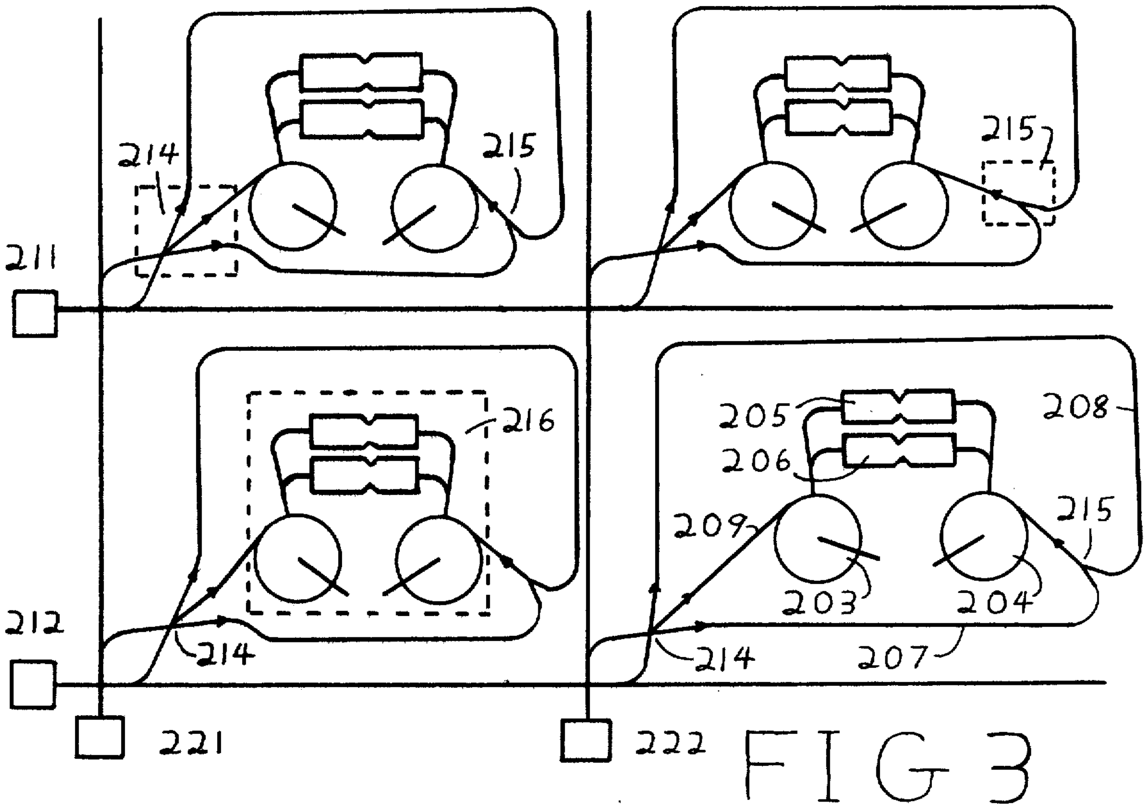
FIG. 3 is a schematic drawing of an array of dual cavity fluid-controlled switches connected fluidically to row and column fluid control lines through fluid logic.
Figure 3A:
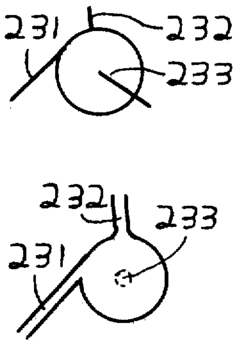
FIG. 3*a* is a schematic symbol for a vortex chamber and a two-dimensional equivalent.
Figure 3B:
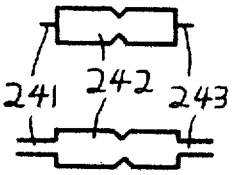
FIG. 3*b* is a schematic symbol for a cavity containing a movable mass and having a port at either end together with a two-dimensional equivalent.
Figure 3C:
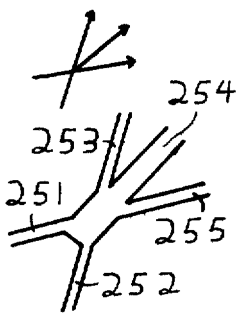
FIG. 3*c* is a schematic symbol for a two input fluid logic device, the center arrow being the logical AND exit and the other two arrows being the exits for logical EXCLUSIVE OR, together with a two-dimensional equivalent.
Figure 3D:
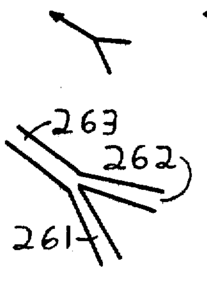
FIG. 3d is a schematic symbol for a logical AND juncture, together with a two-dimensional equivalent.

Before further generalizing the switches already described, two new switching systems incorporating the switches will be described. The first employs fluid-controlled switches at the cross-points; while the second, being capable of a similar description with respect to simultaneous destructive mark operation and also separate row and column resetting operation, employs a conglomerate switch consisting of an electrically-controlled fluid switch followed by a fluid-controlled electrical switch at each cross-point. Referring now to FIG. 3, we see a schematic of four identical switches, one of which is surrounded by dotted lines in the lower left of the schematic and numbered 216. Also shown are four controlled fluid sources numbered 212, 211, 221, and 222. Four fluid logic devices having two inputs and three outputs are shown, one of which is surrounded by dotted lines and labelled 214. Four additional fluid logic devices having two inputs and one output are shown, one of which is surrounded by dotted lines and labelled 215. All other lines shown on the schematic represent fluid carrying channels. There is no fluid connection between lines which cross, but all branches in fluid lines indicate fluid connection to each branch from the trunk. Parts 205 and 206 of a switch represent dual cavities having a small constriction at their centers and containing a globule of conducting liquid. FIG. **3*b* shows the schematic symbol and a two-dimensional drawing for one cavity. Ports 241 and 243 are located at opposite ends of cavity 242. The globule of conducting liquid 244 is at times located on the right end of cavity 242 and is indicated by cross-hatching. Vortex chambers 203 and 204 in FIG. 3 lead radially to opposite ends of dual cavities. FIG. 3*a* shows the schematic symbol and a two-dimensional drawing of a vortex chamber. Channel 231 leads tangentially into a disc-shaped chamber. Channel 232 communicates radially with the disc-shaped chamber. Drain 233 is positioned at the center of the chamber and connected to a low medium pressure reservoir. FIG. 3c shows the fluid logic device having two input and three output ports. The two-dimensional drawing is one possible version; however, any device can be substituted which produces output at one channel when receiving flow at only a first input, output at another channel when receiving flow only at a second input, and output at a third channel when receiving flow at both inputs. There may or may not be amplification in the device. In the pictured device, as shown in the two-dimensional view of FIG. 3c, there is no fluid amplification. If fluid enters only channel 251, it proceeds to channel 255. If fluid enters only channel 252, it proceeds to channel 253. If fluid enters both channel 251 and channel 252, then it proceeds to channel 254. Channel 254 is the logical AND leg. Channels 253 and 255 are the logical EXCLUSIVE OR legs when combined as they are at 215 in FIG. 3. The device at 215 is shown in FIG. 3d. Again, the two-dimensional drawing shows one possible version; but, any device can be substituted which produces an output whenever either of two fluid inputs is present, without causing either signal to back up or stall. Input from either channel 261 or 262 exits along channel 263**. It is important to translate pressure energy to kinetic energy of fluid motion at the fluid logic interaction chambers. Otherwise, a back-up or stall may occur, allowing fluid to enter the wrong channels. Kinetic energy is increased by narrowing the orifice entering the chamber by an amount depending on system parameters such as original operating pressure, normal line cross-section, etc.

Figure 3E:
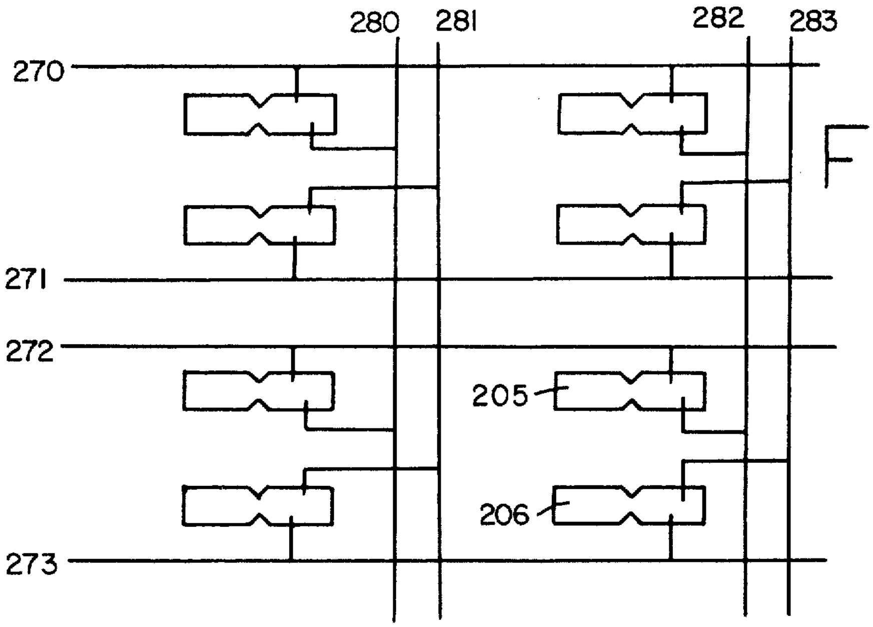
FIG. 3e is a schematic drawing of the cavities of the fluid-controlled switches and their connections with electrical transmission lines.

Only a 2 by 2 array is shown in the schematic; however, larger arrays would be more common. There are two electrical transmission lines, the group of two lines to be referred to subsequently as a unit, associated with each row and two more associated with each column of switches. Referring to FIG. 3e, the pair of transmission lines 270 and 271 are associated with the first row, the pair 272 and 273 are associated with the second row, the pair 280 and 281 with the first column, and the pair of electrical transmission lines 282 and 283 are associated with the second column of switches. Switch cavities 205 and 206 being a cooperating pair are not only part of the second column but also part of the second row of switches. One of the two electrical transmission lines for a given row (column) enters the right end of one cavity in each switch in the given row (column). The other of the two electrical transmission lines for the given row (column) enters the right end of the other cavity in each switch in the given row (column). Thus, the two row transmission lines, forming a row unit, are connected to the two column transmission lines meeting at a cross-point whenever the conductive liquid globules of the switch in that row and column, i.e. at the cross-point, are forced to the right. Thus, in this case a switch is set when the globules are forced to the right and reset when the globules are forced to the left, set implying connection and reset implying disconnection. Notice that there are two sets of units, row units and column units.

The system operates as follows. Suppose we wish to set the switch in the lower left corner while resetting the other switches in the left column and the lower row. Merely activate fluid sources 212 and 221. Since both inputs to the five port fluid logic 214 at the lower left switch are receiving flow, flow will proceed out the middle output and proceed to the left hand vortex chamber eventually pushing the globules to the right, with most control fluid exitting from the right hand vortex chamber. This action has been previously described, since the fluid switch pictured is of standard design, similar to the switch shown on substrate 4, 5, and 6 of FIG. 1 except for containing a dual cavity. The other switches in the left column receive only one fluid input at their five port fluid logic 214. Since the input is at the upper port, fluid exits along the lowest arrow and proceeds to the lower input of the three port logic device 215. From there it enters the right vortex chamber of the switch forcing the globules to the left, thus resetting the switch. Similarly, the other switches in the lower row receive only one fluid input at their five port fluid logic 214. Since the input is at the lower port, fluid exits along the uppermost arrow and proceeds to the upper input of the three port logic device 215. From thence it enters the right vortex chamber of the switch forcing the globules to the left, thus resetting the switch.

Thus, we see how activating two control fluid channels is sufficient to set the switch at the cross-point of the associated row and column, and to reset all other switches of the associated row and column. No other switches are affected. This type of action is known as destructive mark and assures that no row transmission line will be connected to more than one column transmission line and vice-versa.

Besides destructive mark action, it is also possible to reset all switches in a given row or a given column simply by activating the fluid source associated with that row or column. Using this fact, and row and column status interrogation, it becomes possible to wipe out all connections for a conversation in a systematic way. This will be explained in detail after the switching system employing conglomerate switches is described.

The system using conglomerate switches can be made and operated similarly with respect to transmission line hook-ups, destructive mark operation, reset of entire rows (columns) by one signal, and status interrogation to the system just described employing fluid-controlled switches. A similar diagram sustituting conglomerate switches for the fluid-controlled switches, and interpreting the fluid logic device symbols as electronic logic symbols with the same logical AND and EXCLUSIVE OR outputs, and interpreting switch entry of a line from the right or left as a signal to activate resetting or setting, respectively, would apply to a limited version of the conglomerate switch-using system. However, in describing the conglomerate system more general terms will be used and another system schematic will not be given in view of the obvious similarities. Also, more than one array will be discussed in a total system.

The switching system using conglomerate electrically-controlled fluid switches followed by fluid-controlled electrical switches has the following features. It contains a number of row and column arrays of cross-points containing n rows and m columns where n and m can vary from one array to the next. If the switch at the $i^{th}$ row and $J^{th}$ column of an array is set, then a pair of electrical transmission lines, a row unit, entering each switch of the $i^{th}$ row and only switches in the $i^{th}$ row is connected to a pair of electrical transmission lines, a column unit, entering each switch of the $j^{th}$ column and only switches of the $j^{th}$ column in the subject array. At least one separate electrical control signal is associated with each row and each column of the array, giving $n+m$ control signals specifically associated with rows and columns. Each switch representing a cross-point is a conglomerate switch consisting of one or two electrically-operated switches controlling the two fluid inputs of a fluid-controlled switch, the switches on substrates 1 through 6 of FIG. 1 being an example of this. Each electrically-operated switch in the array is directly connected to the same fluid power source. Electronic logic now decides whether or not the array is enabled and logic specific to a given cross-point further senses whether both the row electrical signal and the column electrical signal are on for a given cross-point. If all electric signals for a given cross-point are on, then fluid input is directed to the setting input port of the fluid-controlled switch at the cross-point and fluid input is stopped at the resetting input port. If all electronic control signals associated with a given cross-point are on excepting that either the row or the column electrical control signal but not both is off, then fluid input is directed to the resetting input port of the fluid-controlled switch at the given cross-point and fluid input is stopped at the setting input port. This operation of simultaneous setting and resetting of switches whenever a particular row and column electrical control signal pair is on while all other row and column signals of the array are off is called destructive mark. It guarantees that only one cross-point in a row or column will be in the state set at any given instant, all others in the row and column having been reset in the same operation producing the one set cross-point. In addition to destructive mark operation, if both row and column electrical signals say off at a cross-point then no action is taken. Thus, if it is desired to reset a row after a conversation then let the row signal say "on" and all other row and columns signals say "off". A similar procedure could be used for a column. "On" may imply a lower voltage than "off".

Destructive mark is not a new concept, but in this instance the necessary logical AND and EXCLUSIVE OR logic can be embodied in the electronics and can be placed near the cross-points, if desired. Thus, neither fluid nor electric switching power lines need be run inidividually for rows and columns. A general electrical power bus or grid applying to all switches of the array can be selectively tapped or not at a given cross-point depending on electronic logic placed near the cross-point. Each electrically-operated fluid switch can also tap the same source of fluid power so the input to the whole array is directly connected in a fluid sense.

The words row and column need not be taken literally, but could simply correspond to the first and second subscript of a numbering system to describe cross-points which can be arranged along a straight line or even in a cube, if desired. Also the fluid-operated switches need not be arranged the same way spatially as are the corresponding electrically-operated switches. For instance, if the switches are all along the same line, and numbered from 1 to nm, then electrical connections corresponding to the $i^{th}$ row in an n by m array might connect to every $m^{th}$ switch starting with the $i^{th}$ one, and electrical connections corresponding to the $j^{th}$ column might connect to switches in positions $(j-1)n+1$ through position jn.

As a matter of interest, assuming that mercury globules are used in the fluid-controlled switch, mercury evaporation, which is very slow in any case, can be retarded or even reversed by using a closed fluid driving system and saturating the driving fluid with mercury vapor. If the switches are cooled below the average system temperature they will actually gain mercury. In any case, there is very little interchange of fluid between any mercury containing cavity and the rest of the fluid system since fluid never passes entirely through the cavity.

If we now include the fact as previously mentioned that rows and columns of switches can be interrogated as to status, it becomes possible to reset all cross-points involved in a particular conversation once a subscriber disconnects. First disconnect the subscriber's row. This will mean that upon interrogation the associated column will have a free status. This status should be interpreted as an order to disconnect the associated column in the next or second switching stage. This will mean that the row containing the cross-point will now indicate a free status. This free status of the row in the second stage indicates that the associated row in the third stage should be reset. Soon all cross-points which were involved in the particular conversation will be reset, and all lines will be free for use.

The mercury globule or globules can be replaced as the movable mass in the cavity or cavities of the fluidically-controlled switch by a plunger or plungers. The plunger could be shaped as a sphere, a cylinder, a rectangular solid, or some other convenient shape. It can be electrically conducting, or parts of it may be conducting, or it may be an electrical insulator. If desired, the plunger could be hollow to reduce weight. It can either slide or roll, as it is pushed back and forth in the cavity by fluid pressure. If sliding, then various known means can be used to reduce friction. If the plunger is a rectangular solid or a cylinder, then more than one circuit can be simultaneously opened and closed by the same plunger. A set of spaced rings or half-rings on the plunger or in the cavity perpendicular to the direction of motion could be used to close and open electrical circuits.

Figure 4:
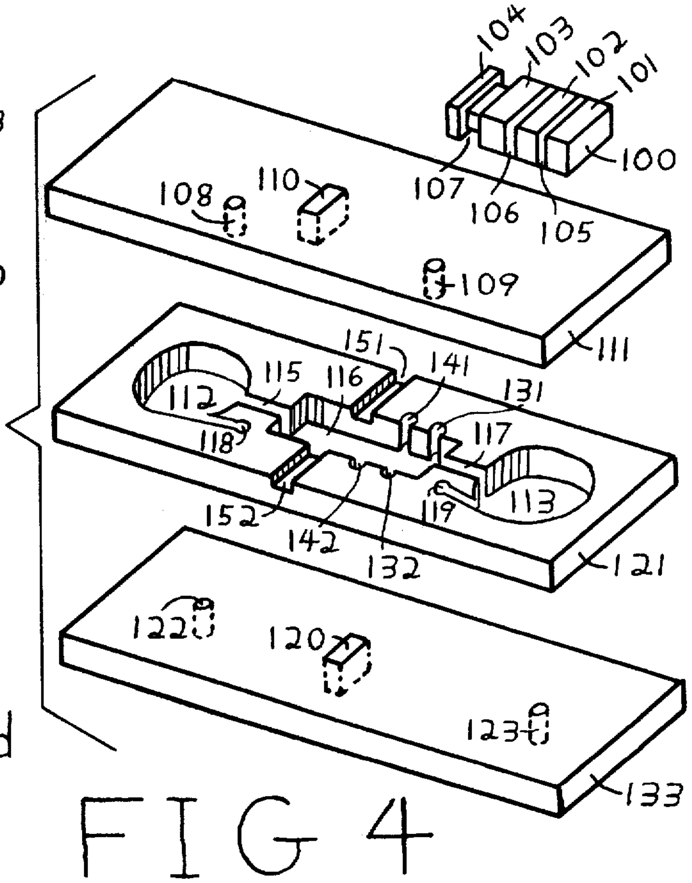
FIG. 4 is an exploded perspective view of a fluid-controlled switch capable of switching one optical or fluidic signal and two electrical signals by the motion of a plunger also shown.

Refer now to FIG. 4, where is shown an exploded perspective view of a fluid-controlled switch and the rectangular solid to be inserted as a plunger. Logical power inputs 108 and 109 on substrate 111 connect to channels 118 and 119, respectively, on substrate 121, when the switch is assembled. Channels 118 and 119 lead tangentially into vortex chambers 112 and 113, respectively. The chambers are connected radially to opposite ends of cavity 116, through channels 115 and 117, respectively. Holes 122 and 123, respectively, on substrate 133, act as drains at the centers of vortex chambers 112 and 113, respectively, when the switch is assembled. Before assembly, plunger 100 is inserted into chamber 116. Then the substrates are assembled in numerical order from top to bottom and joined together. Parts 101, 102, 103, and 104 of plunger 100 are sections of the same rectangular solid. Conducting strips 105 and 106 may be indented, flush with, or slightly raised from the rectangular solid, and they are electrically-conducting bands around the plunger. Channel 107, which is a continuous groove cut into each side of plunger 100, may be used to conduct either light or fluid. If conducting light, its sides may be mirrors and only a groove on one side of the plunger would be necessary.

Hollows 131 and 132 and hollows 141 and 142 contain pairs of electrical terminals, which will be connected by conducting strips 105 and 106, respectively, whenever the plunger resides in the rightmost stable position in cavity 116. The two pairs of electrical terminals will both be disconnected, whenever the plunger resides in its leftmost stable position.

Channels 151 and 152, on substrate 121, represent fluid channel signal inputs, and holes 110 and 120, on substrates 111 and 133, respectively, represent fluid signal outputs. The outputs are symmetrical with respect to the plunger. If the inputs 151 and 152 were also symmetrical with respect to the plunger, then the net sideways force on the plunger, due to signal flow or blockage, would always be zero. Thus, large signals could be switched by a relatively small control signal, which fact describes a good fluidic amplifier. One way to make the input signal channels symmetrical would be to produce a second set of channels 151 and 152 immediately below the first set, on the lower face of substrate 121. There are many other obvious ways to produce symmetrical inputs. In operation fluid flow is fully connected when and only when the plunger is in its rightmost stable position and is fully blocked when and only when the plunger is in its leftmost stable position. Note also that signal fluid and switching fluid never intermix because part of the plunger always separates the two.

Channels 151 and 152 could equally well represent light channels with reflecting sides. Either could be input and the other could be output. The channels could be filled with a fiber optic, or glass, or clear plastic, etc., if desired. In the optical case, as opposed to fluidic, only the groove above plunger 100, representing a part of groove 107, need be formed. It can be lined with mirrors, or filled with a light pipe (fiber optic, glass, or plastic, etc.). The light channels on substrate 121 and groove on plunger 100 will fully mate when and only when the plunger is in its rightmost position, thus transmitting light between grooves 151 and 152. No mating occurs when the plunger is on its leftmost position, so no light will be transmitted in this position. Other methods of switching between transmission and nontransmission for light signals using a plunger will be obvious to those who know the laws of reflection, refraction, and other optical laws.

Any combination of types of switchable signals and any multiplicity of signals of a particular type can be switched by the same plunger, with corresponding set and reset positions of the plunger arbitrarily chosen for each signal. The illustration in FIG. 4 shows two electrical signals and one fluid signal being switchable by the same plunger. In this example the set position of the plunger for all three signals is the same (to the right).

Most of the statements which applied to switching mercury globules can apply well to the switching of plungers or balls. For instance, more than one plunger in more than one parallel cavity can be switched simultaneously. Also, conglomerate switches are possible. Also, mercury globules can be replaced by globules of other conductive liquids known in the art, or in some applications can be replaced with non-conductive liquids, as when switching only light and fluid signals.

The following statement is applicable to all fluid-controlled switches whether the movable mass is a plunger or a liquid globule. If it is desired that the switch maintain its switched state when fluid power is interrupted or under heavy vibration conditions, it may be necessary to add a means of latching the movable mass in any of its stable states. Such latching means may include potential energy fields in which the energy may be electromagnetic, electrostatic, gravitational, deformation, adhesion, or surface tension energy. If the potential energy is least at the positions of the stable switch states, then these positions will tend to be maintained until sufficient pressure builds in the appropriate complex to unlatch the movable mass. Bodies which maintain an electric charge, called electrets, are now available as well as permanent magnets. Either can be inserted at the ends of a cavity to attract the movable mass. A material which adheres strongly to the movable mass can likewise be inserted at either end. A constriction in the center can facilitate latching of liquids due to surface tension energy. Many latches are known using deformation energy.

Summarizing the main contributions of this invention, it provides an improved fluid-controlled switch capable of use as a fluid amplifier or as a transducer from fluid to electrical or optical signals. The switch is also capable of being used as a component of a conglomerate electrical relay switch having total isolation between electrical transmission circuits being switched and electrical circuits performing the switching. Multiple signals chosen in any manner from the categories electrical, optical, and fluidic can be simultaneously switched by the same switch, thus allowing status interrogation for various groupings of switches. Open-circuit resistance is very high while closed-circuit resistance is very low, due to mercury contact.

The switch makes very efficient use of fluid switching power. The switch is small and capable of construction by a combination of fluidic and electronic mass-production techniques allowing hundreds of switches per cubic inch.

Other contributions of the current invention include a transducer to convert heat energy to fluid flow power, and a non-symmetrical three-port fluid system to inhibit flow from a first specific port to a second specific port but to allow uninhibited flow between any other pair of ports. While certain new aspects of systems allowing simple methods of producing destructive mark switching and of producing simple line status interrogations have been described, specific electronic and fluidic configurations of hook-ups to produce an actual telephone switching network have not been shown but many possibilities would be obvious to engineers working in the field. It is hoped that none of these obvious configurations will work to restrict the application of this patent.

While the present invention has been disclosed in connection with the preferred embodiments thereof, there are other obvious variances of the present invention which fall within the spirit and scope thereof as defined by the appended claims.

What is claimed is:

1. A fluid-controlled switch comprising a movable mass, a solid casing having entities defined therein as follows, a cavity containing the said movable mass, a respective control fluid opening at each of two separate locations in said cavity, each said opening being used both to admit fluid into the cavity and to expel fluid from the cavity, the surface of said movable mass dividing the volume of the cavity, exclusive of the volume of said movable mass, into two separate parts, each separate part containing one of said two separate locations respectively, with either part shrinking when the movable mass moves in its direction, two separate chambers in which control fluid flow can interact, one example of a chamber being a volume at the juncture of three fluid channels, each such chamber respectively being connected to a respective said control fluid opening, each said chamber thus respectively being able to exchange fluid between itself and a respective one of said two separate parts, at least one control fluid output being connected to one said chamber and at least one control fluid output being connected to the other said chamber, each said control fluid output mainly serving as an exit for control fluid from its chamber, with only a minor amount, if any, of control fluid ever entering a chamber at any said control fluid output during normal operation, at least one control fluid input being connected to one said chamber, and at least one other control fluid input being connected to the other said chamber, each said control fluid input mainly serving as an entrance for control fluid to its chamber, with only negligible amounts of liquid, if any, ever exiting from a chamber through a control fluid input during normal operation, said control fluid inputs each separately being normally connected in a position to have flow originating from a high pressure source introduced into a chamber through itself, the existence or not of said flow being under the control of some logic external to the fluid-controlled switch, said control fluid inputs being the predominant means by which fluid enters the volume consisting of all said chambers together with the said two separate parts of the said cavity, said movable mass being forced to one of two stable positions whenever sufficient flow enters one of said two separate chambers through at least one control fluid input and substantially no other fluid enters either of said two chambers through a control fluid input, and being forced to the other of said two stable positions whenever sufficient flow enters the other of said two chambers through at least one control fluid input and negligible other fluid enters either of said two chambers through a control fluid input, said fluid controlled switch further comprising means to cause fluid flow to interact selectively to establish turbulence selectively as follows, so that for a given discharge rate at a control fluid output from a given chamber, which rate may be caused by a combination of flow entering the chamber through a said control fluid input and by motion of the said movable mass, the volume average of pressure in the given chamber and that part of the cavity connected thereto is much higher after dynamic equilibrium is reached if flow is entering the chamber through a control fluid input, due to turbulent flow being established in this first case, than if the same discharge rate at the control fluid output is due mainly to movement of the movable mass, in which second case little, if any, turbulent flow relative to that in the first case exists.

2. The fluid-controlled switch of claim 1 having only two control fluid inputs, one for each chamber.

3. The fluid-controlled switch of claim 1 wherein the said movable mass has some spatially separate parts each separately alternately permitting and blocking conduction of at least one separate signal between a different pair of signal paths, each path extending into the switch, said permitting and blocking occuring respectively whenever said movable mass alternately assumes each of its two stable positions.

4. The fluid-controlled switch of claim 1 wherein said movable mass consists of any number of mercury globules each contained in a tube-like cavity, said tube-like cavities being connected in parallel to form a composite cavity, so that one end of each tube-like cavity is connected to a first of said two separate chambers and the other end of each tube-like cavity is connected to the second of said two separate chambers.

5. The fluid-controlled switch of claim 1 further containing at least one first means to conduct electric current to and from the interior of said switch and at least one second means to conduct electric current to and from the interior of said switch, said at least one first means and said at least one second means being electrically connected whenever said movable mass is in one of its said stable positions, and being electrically disconnected whenever said movable mass is in the other of its said stable positions.

6. The fluid-controlled switch of claim 1 further containing at least one first means other than the control inputs and outputs to conduct fluid to and from the interior of said switch and at least one second means other than the control inputs and outputs to conduct fluid to and from the interior of said switch, said at least one first means and said at least one second means being fluidically connected whenever said movable mass is in one of its said stable positions, and being fluidically disconnected whenever said movable mass is in the other of said two stable positions.

7. The fluid-controlled switch of claim 1 further containing at least one first pathway which allows light to travel from the exterior to the interior of said switch, and at least one second pathway which allows light to travel from the interior of the exterior of said switch, said at least one first pathway and said at least one second pathway being optically connected whenever said movable mass is in one of its said stable positions and being optically disconnected whenever the movable mass is in the other of said two stable positions.

8. The fluid-controlled switch of claim 1 wherein more than one type of signal is switched, the signals being members of a class containing optical, electromagnetic, electrical, and fluidic signals, and wherein either of said two stable positions for the movable mass may imply setting for any particular signal, resetting for that particular signal being implied by the other stable position.

9. The fluid-controlled switch of claim 1 wherein at least one primary signal is transmitted through said switch when the movable mass is in one of said two stable positions, and at least one status signal is transmitted through said switch when the said movable mass is in the other of said two stable positions.

10. A group of logic elements, with switches falling under the broad definition of logic elements, having as one component a fluid-controlled switch, which fluid-controlled switch comprises a movable mass, which switch further comprises a solid casing having entities defined therein as follows, a cavity containing the said movable mass, a control fluid opening at each of two separate locations in said cavity, each said opening being used both to admit fluid into the cavity and to expel fluid from the cavity, the surface of said movable mass dividing the volume of the cavity, exclusive of the volume of said movable mass, into two separate parts, each separate part containing one of said two separate locations respectively, two separate chambers in which control fluid flow can interact, one example of a chamber being a volume at the juncture of three fluid channels, each such chamber respectively being connected to a respective said control fluid opening, each said chamber thus respectively being able to exchange fluid between itself and a respective one of said two separate parts, at least one control fluid output being connected to one said chamber, and at least one control fluid output being connected to the other said chamber, each said control fluid output mainly serving as an exit for control fluid from its chamber, with only a minor amount, if any, of control fluid ever entering a chamber at any said control fluid output during normal operation, one control fluid input being connected to one said chamber, and one other control fluid input being connected to the other said chamber, each said control fluid input mainly serving as an entrance for control fluid to its chamber, with only negligible amounts of fluid, if any, ever exiting from a chamber through a control fluid input during normal operation, said control fluid inputs each being separately connected in a position to have flow originating from a high pressure source introduced into a chamber through itself, the existence or not of said flow being under the control of some logic external to the fluid-controlled switch, each said control fluid input being the predominant means by which fluid enters the volume consisting of the said chamber connected to said input combined with that part of the said cavity connected thereto, said movable mass being forced to one of two stable positions whenever sufficient flow enters one of said two separate chambers through one control fluid input and substantially no other fluid enters either of said two chambers through a control fluid input, and being forced to the other of said two stable positions whenever sufficient flow enters the other of said two chambers through the other control fluid input and negligible other fluid enters either of said two chambers through a control fluid input, at least two signal conducting paths leading into and out from the said fluid-controlled switch such that whenever said movable mass is in one of said two stable positions signals can travel between said at least two paths, and such that whenever said movable mass is in the other of said two stable positions said at least two paths are disconnected at the switch so that signals cannot travel between said at least two paths at the switch, a group of fluid outputs consisting of at least two fluid outputs, said group of fluid outputs originating from at least one electrically-controlled device, said fluid-controlled switch having one said control fluid input connected by flow confining means to at least one output belonging to said group of fluid outputs and having the other said control fluid input connected to at least another output belonging to said group of outputs, flow exiting and not exiting respectively from any particular one output belonging to said group of fluid outputs depending on electrical control signals controlling its device, the current and past state of said electrical control signals thus determining the position of said movable mass by controlling the said group consisting of at least two fluid outputs, which group of fluid outputs in turn determine the flows at the control fluid inputs of said fluid-controlled switch, which flows determine the position of said movable mass.

11. The group of logic elements of claim 10 wherein each one of said group of fluid outputs originates from the same one electrically-controlled device, whose fluid outputs being exactly two are each directly connected by flow confining means to a different one of the two control fluid inputs of said fluid-controlled switch and to no other control fluid input of any switch, the fluid outputs of said electrically-controlled device producing flow, originating from a high pressure source, from the first of its two fluid outputs and substantially no flow from the second output in a first stable operating mode and producing flow, originating from a high pressure source, from the second output and substantially no flow from the first output in a second stable operating mode, the said movable mass of the fluid-controlled switch being moved to one of its two stable positions whenever the electrically-controlled device is operated for a sufficient time in said first stable mode, said movable mass being moved to the other of its two stable positions whenever the electrically-controlled device is operated for a sufficient time in the said second stable mode, the mode of said electrically-controlled device and transition between modes being determined by electrical control signals over an interval of time.

12. A switching system comprising units, a unit being a group of two or more transmission lines, for example a pair of electrically conducting lines which could cooperate to carry a telephone conversation, some of the units being members of a first set and the rest of the units being members of a second set with no unit being a member of both sets, a switch associated with each possible special pair of units, a special pair of units being one unit taken from said first set and one unit taken from said second set, the switches and the special pairs being in a one to one correspondence, each switch associated with a given special pair of units connecting one of the units in the pair to the other unit in the pair at all times when the switch is set, and being capable of disconnecting the one unit of the pair from the other unit of the pair when the switch is reset if additionally each unit of the pair is not connected to mutually connected units outside of the pair, the word "connect" meaning enable transmission between, and "the connecting of two units" meaning the connecting of the corresponding transmission lines within one unit to the corresponding transmission lines within the other unit, the switch being either set or reset at all times except during transition between the set and reset states, which states will be further defined later, the said switch associated with a given special pair of units being incapable working alone of connecting any pair of units other than its associated special pair, the switching system further comprising fluid carrying control lines in a one to one correspondence with the said units, which units are defined above, and a number of fluid logical devices, one and only one being associated with each switch, so that each said fluid logical device can be thought of as a part of the switch with which it is associated, each fluid carrying control line which corresponds to a given said unit communicating in a fluid sense with each and only those fluid logical devices associated with those switches which are capable acting alone of connecting that given unit with some other said unit, so that for each switch the two control lines, one corresponding to each unit of the pair of units with which the switch is associated, both communicate directly in a fluid sense with the fluid logical device associated with that switch and those two control lines do not both communicate directly with the logical device associated with any other switch, the word "directly" meaning without both entering and leaving, i.e. flowing through, another of said fluid logical devices, any given switch being set to connect the one unit in the associated special pair of units to the other whenever both fluid control lines entering the fluid logical device associated with the switch are activated for a sufficient time with fluid energy, any given switch being reset to disconnect the associated special pair of units whenever one but not the other fluid control line entering the logical device associated with the switch is activated for a sufficient time, with fluid energy, unless the said pair of units is also connected by means other than the given switch.

13. A fluid-controlled switch comprising a movable mass, a solid casing having entities defined therein as follows, a cavity containing the said movable mass, a control fluid opening associated with said cavity, said opening being used both to admit fluid into the cavity and to expel fluid from the cavity, the surface of said movable mass dividing the volume of the cavity, exclusive of the volume of the movable mass, into two separate parts, one and only one said separate part, to be hereafter referred to as the first part of said cavity, being contiguous to said control fluid opening, with either part shrinking when the movable mass moves in its direction, a chamber, one example of a chamber being a volume at the juncture of three fluid channels, in which chamber control fluid flow can interact, said chamber being connected to said control fluid opening, said chamber thus being able to exchange fluid between itself and the first part of said cavity, at least one control fluid output being connected to the said chamber, each said control fluid output mainly serving as an exit for control fluid from its chamber, with only a minor amount, if any, of control fluid ever entering said chamber at any said control fluid output during normal operation, at least one control fluid input being connected to the said chamber, each said control fluid input mainly serving as an entrance for control fluid to its chamber, with only negligible amounts of fluid, if any, ever exiting from said chamber through a control fluid input during normal operation, said control fluid inputs each separately being normally connected in a position to have flow originating from a high pressure source introduced into said chamber through itself, the existence or not of said flow being under the control of some logic external to the fluid-controlled switch, said control fluid inputs being the predominant means by which fluid enters the volume consisting of said chamber combined with the first part of said cavity, said movable mass being forced to a position other than a given stable position whenever sufficient flow enters said chamber through any said at least one control fluid input and substantially no other fluid flow blocks the motion of said movable mass as an effect of said other fluid flow entering the switch, said movable mass returning under at least some conditions in normal operation to its said given stable position when no flow enters said chamber through a control fluid input, the pressure at part of the said surface of said movable mass being much higher when said chamber is receiving flow at a control fluid input than when it is not, said fluid-controlled switch further comprising means to cause fluid flow to selectively interact to establish turbulence selectively as follows, so that for a given discharge rate at a control fluid output from said chamber, which rate may be caused by a combination of flow entering the said chamber through a said control fluid input and by flow produced by motion of said movable mass, the volume average of pressure in the given chamber and the first part of said cavity is much higher after dynamic equilibrium exists if flow is entering the chamber through a said control fluid input, due to turbulent flow being established in this first case, than if the same discharge rate at the control fluid output is due mainly to movement of the said movable mass, in which second case little, if any, turbulent flow relative to that in said first case exists.

14. The group of logic elements of claim 14 wherein said fluid-controlled switch comprises at least two substrates bonded together with some major surfaces opposing each other.

15. A system containing at least one miniature fluid-controlled switch, wherein said fluid-controlled switch comprises more than one substrate bonded together with some major surfaces opposing each other, said fluid-controlled switch comprising a movable mass, a solid casing having entities defined therein as follows, a cavity containing the said movable mass, a control fluid opening associated with said cavity, said opening being used both to admit fluid into the cavity and to expel fluid from the cavity, the surface of said movable mass dividing the volume of the cavity, exclusive of the volume of the movable mass, into two separate parts, one and only one said separate part, to be hereafter referred to as the first part of said cavity, being contiguous to said control fluid opening, with either part shrinking when the movable mass moves in its direction, a chamber, one example of a chamber being a volume at the juncture of three fluid channels, in which chamber control fluid flow can interact, said chamber being connected to said control fluid opening, said chamber thus being able to exchange fluid between itself and the first part of said cavity, at least one control fluid output being connected to the said chamber, each said control fluid output mainly serving as an exit for control fluid from its chamber, with only a minor amount, if any, of control fluid ever entering said chamber at any said control fluid output during normal operation, at least one control fluid input being connected to the said chamber, each said control fluid input mainly serving as an entrance for control fluid to its chamber, with only negligible amounts of fluid, if any, ever exiting from said chamber through a control fluid input during normal operation, said control fluid inputs each separately being normally connected in a position to have flow originating from a high pressure source introduced into said chamber through itself, the existence or not of said flow being under the control of some logic external to the fluid-controlled switch, said control fluid inputs being the predominant means by which fluid enters the volume consisting of said chamber combined with the first part of said cavity, said movable mass being forced to a position other than a given stable position whenever sufficient flow enters said chamber through any said at least one control fluid input and substantially no other fluid flow blocks the motion of said movable mass as an effect of said other fluid flow entering the switch, said movable mass returning under at least some conditions in normal operation to its said given stable position when no flow enters said chamber through a control fluid input, the pressure at part of the said surface of said movable mass being much higher when said chamber is receiving flow at a control fluid input than when it is not.

* * * * *